United States Patent Office 3,056,437
Patented Oct. 2, 1962

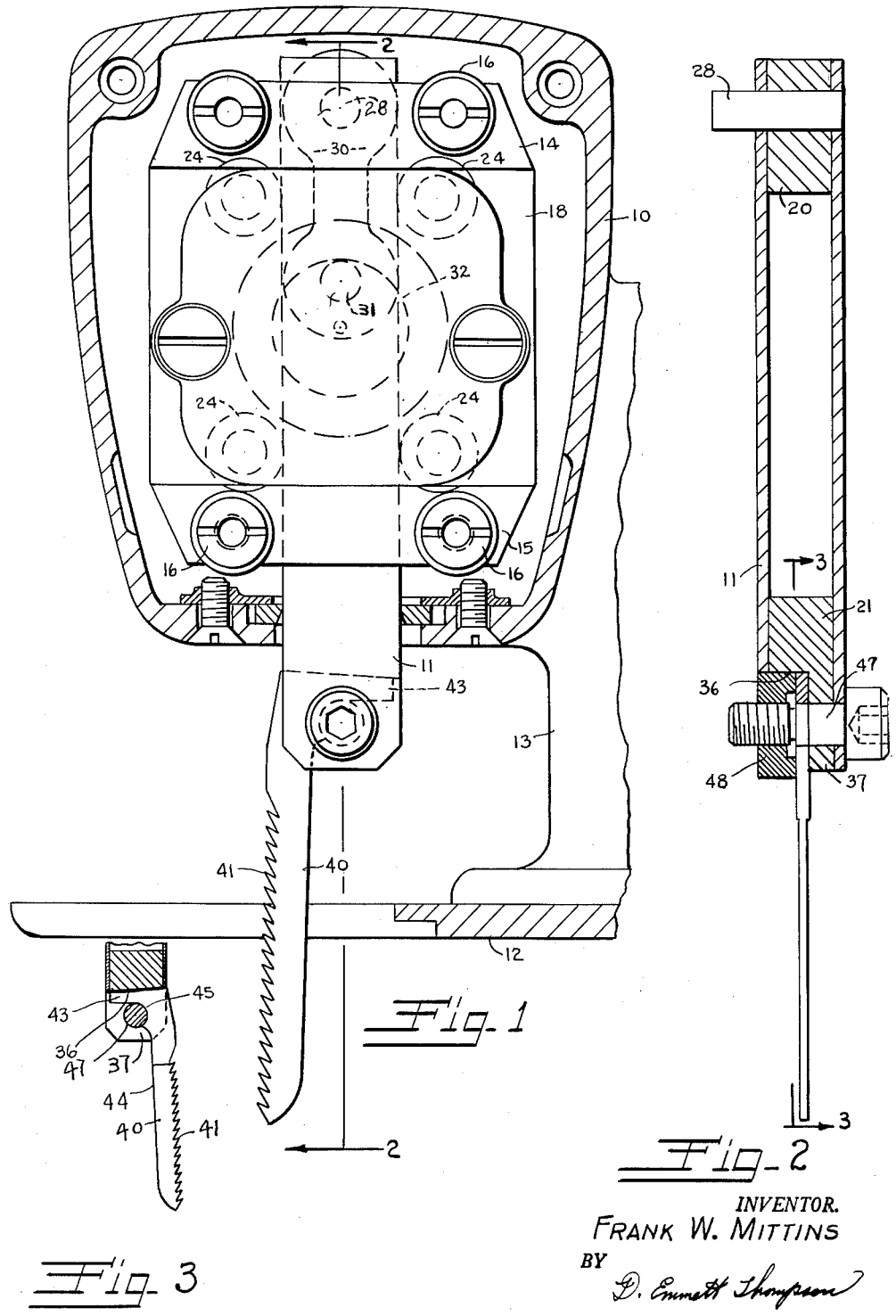

3,056,437
SABER SAW
Frank W. Mittins, Memphis, N.Y., assignor to The Porter-Cable Machine Company, Syracuse, N.Y., a corporation of New York
Filed Jan. 22, 1957, Ser. No. 635,163
1 Claim. (Cl. 143—68)

This invention has to do with power-operated, saber saws, wherein a saw blade carrier is mounted for reciprocation in an enclosed housing, and has an end portion extending outwardly therefrom and to which a saw blade is fixedly secured whereby, upon reciprocation of the carrier, similar movement is imparted to the saw blade. The saw blade is formed along its forward edge with a series of cutting teeth. A saw of such type is disclosed in Patent No. 2,737,984, issued March 13, 1956, to J. P. Bruck. In such saws, the blades are fixed to the carrier in such manner that the tooth cutting edge of the blade extends substantially parallel to the reciprocatory movement of the blade carrier.

This invention has as an object a saber saw embodying a particularly economical construction for detachably clamping the saw blades to the projecting end of the blade carrier and wherein the tooth cutting edge of the blade inclines upwardly and toward the axis of the plane in which the blade carrier is reciprocated.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a vertical sectional view of the housing in which the saw blade carrier is mounted for reciprocation, with the blade carrier and actuating mechanism shown in elevation.

FIGURE 2 is a view taken on line 2—2, of FIGURE 1.

FIGURE 3 is a view taken on line 3—3, FIGURE 2.

10 designates an enclosed housing in which the blade carrier 11 is mounted for reciprocation toward and from a base plate 12 affixed to the housing by a pedestal 13.

Referring to FIGURE 1, the upper and lower guideways 14, 15, are fixedly mounted on the inner wall of the housing, as by fastening members 16. A block 18 is slidably mounted for transverse reciprocation on the guides 14, 15, and is formed with a centrally located vertically extending slot in which the blade carrier 11 is slidably mounted. The blade carrier is preferably of tubular formation, as shown in FIGURE 2, and has a block 20 affixed in its upper end, and a block 21 affixed in its lower end. The blade carrier may be guided in vertical reciprocation by rollers 24 carried by the block 18, the rollers serving to reduce frictional engagement between the blade carrier and the block 18.

The upper block 20 of the blade carrier is provided with a laterally extending pin 28, and a connecting rod 30 is connected to the pin 28, and a crank pin 31 journalled in the housing and operatively connected to a motor.

The block 18 is reciprocated horizontally by a cam 32 also connected to the motor and arranged to provide rearward movement toward the right, FIGURE 1, upon downward movement of the blade carrier 11. Upon upward movement of the blade carrier, the block and the carrier are moved by the cam to the left, FIGURE 1, to effect engagement of the cutting teeth of the blade with the work piece, on the surface of which the base plate 12 is positioned.

Reference may be had to the Bruck patent, above mentioned, for illustration of the motor and motion transmitting means in more specific detail.

The lower end of the blade carrier 11 is machined to provide a transversely extending shoulder 36, and a portion 37 of reduced thickness. The saw blade 40 is formed along its forward edge with cutting teeth 41 angled upwardly because the cutting is performed upon the upward movement of the blade toward the housing 10. The blade, at its upper end, is formed with a rearwardly extending tongue portion 43, the under or lower edge of which merges with the rear edge 44 of the blade on a radius 45.

The reduced portion 37 of the carrier is apertured to receive a pin in the form of a screw 47. The arrangement of the radius 45 relative to the shoulder 36 is such that the circular body portion of the screw 47 is positioned in the radius 45, and with the upper edge of the tongue portion 43 abutting against the shoulder 36. The blade is detachably clamped against the portion 37 of the carrier by means of a nut 48 threaded on the screw 47. The shoulder 36 and the upper edge of the tongue portion 43 are formed so that the forward toothed cutting edge of the blade inclines upwardly and toward the axis of the carrier 11, as shown in FIGURES 2 and 3 of the drawings. This inclination of the cutting edge of the blade, in conjunction with the lateral reciprocation of the blade holder, greatly improves the cutting action of the saw.

With this arrangement, the blades 40 are quickly and conveniently secured to the lower end of the blade carrier and, because of the arrangement of the shoulder 36, the formation of the tongue portion 43 of the blade, and the location of the clamping screw 45, the blades are rigidly affixed to the blade holder, and it will be apparent that this arrangement accommodates blades equally well of all different thicknesses.

What I claim is:

A bayonet saw structure comprising a work engaging plate formed with a saw blade receiving aperture, a housing attached to said plate, a blade holder mounted for reciprocation toward and from said plate and having an end portion extending from the housing toward said plate, said end portion of the carrier being of reduced thickness providing a transversely extending shoulder, a saw blade formed with teeth along its forward edge and having a tongue portion extending rearwardly from said toothed edge at the upper end of the blade, the under side of said tongue portion merging with the rear edge of the blade on a radius, the upper end portion of said blade being positioned on said reduced portion of the carrier, with the upper edge of said tongue portion abutting against said shoulder, a pin extending through the reduced portion of the carrier and engaging said radius of the blade, a nut having threaded connection with said pin and cooperable to detachably clamp the upper portion of the blade against the reduced portion of the carrier, the body portion of said blade extending downwardly through said blade receiving aperture in the work engaging plate.

References Cited in the file of this patent

UNITED STATES PATENTS

| | | |
|---|---|---|
| 1,826,187 | Pickering | Oct. 6, 1931 |
| 2,015,535 | Sacrey | Sept. 24, 1935 |
| 2,496,365 | Aaron | Feb. 7, 1950 |
| 2,646,094 | Russel | July 21, 1953 |
| 2,722,244 | Schultz | Nov. 1, 1955 |
| 2,737,984 | Bruck | Mar. 13, 1956 |